United States Patent [19]

Burrage

[11] 4,407,118

[45] Oct. 4, 1983

[54] GAS TURBINE ENGINE FUEL CONTROL SYSTEM

[75] Inventor: Robert G. Burrage, Solihull, England

[73] Assignee: Lucas Industries Limited, Birmingham, England

[21] Appl. No.: 279,031

[22] Filed: Jun. 30, 1981

[30] Foreign Application Priority Data

Jul. 10, 1980 [GB] United Kingdom ................. 8022567

[51] Int. Cl.³ .............................................. F02C 9/28
[52] U.S. Cl. ................................................ 60/39.281
[58] Field of Search ........................... 60/39.28 R, 243

[56] References Cited

U.S. PATENT DOCUMENTS 3,469,395  9/1969  Spitsbergen .................... 60/39.28 R
3,672,163  6/1972  White ............................. 60/39.28 R
3,854,287  12/1974  Rembold ........................ 60/39.28 R Primary Examiner—Louis J. Casaregola
Attorney, Agent, or Firm—Ferguson, Baker, Whitham, Spooner and Kroboth

[57] ABSTRACT

A fuel system includes a known hydromechanical governor fuel control, which has an electromechanical trim device. The trim device is controlled by a circuit which includes an error signal generating means for producing an error signal representing the difference between the desired and actual values of an engine parameter a proportional-plus-integral controller circuit, a trim datum signal generator and a differentiator which connects the generator to the integrator of the controller, so that in transient conditions the integrator output will ramp to a new value required for a new steady state condition.

1 Claim, 1 Drawing Figure

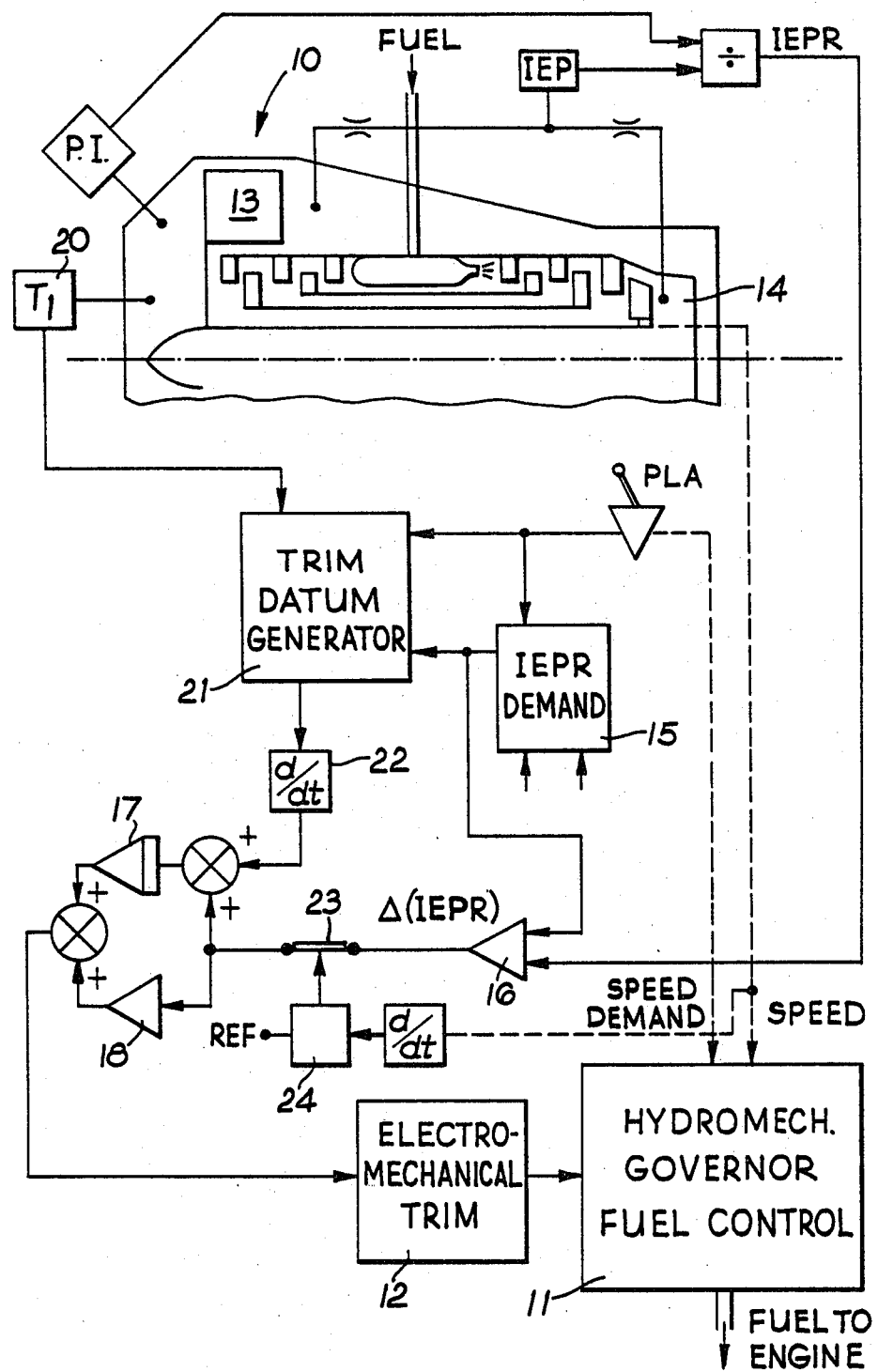

GAS TURBINE ENGINE FUEL CONTROL SYSTEM

This invention relates to a gas turbine engine fuel control system of the kind including an hydromechanical speed governor fuel control in which a fuel valve is movable (to vary fuel flow to the engine) under the influence of a control input element operable, for example, by the pilot of an aircraft in which the engine is installed, and speed sensing means, the effect of said control input element on said fuel valve being variable through the intermediary of an electromechanical trim device controlled by an electronic control circuit sensitive to at least one engine parameter.

With systems of this kind problems arise with overshoot which occurs following a step change in the control input. It is an object of the present invention to provide a fuel control system of the kind specified in which such overshoot is avoided or at least brought under control.

In accordance with the invention there is provided a fuel control system of the kind specified in which the electronic control circuit controlling the electromechanical trim device includes error signal generating means for producing an error signal representing the difference between the desired and actual values of said engine parameter, a proportional-plus-integral controller circuit for producing an output signal which is applied to said electromechanical trim device, means for generating a trim datum signal dependent on the control input and a differentiating circuit to which the trim datum signal is applied, the output of the differentiating circuit being applied to the input of an integrator forming part of the proportional-plus-integral controller circuit.

With such an arrangement, in steady running conditions the output of the differentiating circuit is zero so that, it has no effect on the operation of the proportional-plus-integral controller circuit. In transient conditions, however, the differentiator output will depart from zero and will cause the output of the integrator of the proportional-plus-integral controller circuit to ramp to a new value corresponding to the required value of the integrator output in the new steady running condition.

An example of the invention is shown in the accompanying drawing which is a block diagram of the fuel control system.

The system described is intended to control the fuel flow to a ducted fan type gas turbine engine 10. The fuel control itself is a hydromechanical system 11 as described in detail in U.K. Patent Specification No. 1465477 and will not be described in detail herein, the present invention being more particularly concerned with the generation of an electrical signal to control an electromechanical trim element 12 in the form of a torque motor providing a mechanical trim input to the system 11.

The trim signal generating circuit utilizes an input signal dependent on an engine parameter known as the integrated exhaust pressure ratio (IEPR) which is derived by dividing an electrical signal representing the integrated exhaust pressure (IEP), being a pressure at a tapping on an air potentiometer connected between one pressure tapping downstream of the fan 13 of the engine and another pressure tapping in the outlet 14 of the core engine, by an electrical signal representing the pressure in the engine air intake upstream of the fan 13.

An IEPR demand signal generator 15 is provided for generating an IEPR demand signal as a function of the position of the pilot's lever (with other engine parameters as extra inputs to this generator). The actual IEPR signal and the IEPR demand signal are applied to an error signal generator 16, the error signal Δ IEPR output of which is applied to the inputs of an integrator 17 and a linear amplifier 18 the outputs of which are added together, so that integrator 17 and amplifier 18 provide a proportional-plus-integral controller circuit generating the trim signal which is applied to the trim element 12.

The PLA signal, the IEPR demand signal and a temperature signal derived from a transducer 20 in the air intake, are applied to a trim datum signal generator 21. This generator generates a trim datum signal by dividing a signal representing the difference between the maximum permissable high pressure spool speed at the existing PLA setting and a minimum permissible speed at that setting by a signal representing the difference between the maximum speed and a calculated desired speed signal derived by multiplying a function of the IEPR demand signal by a function of the temperature signal.

The output of the trim datum signal generator 21 is applied to a differentiating circuit 22 the output of which is summed with the error signal Δ IEPR for application to the input of the integrator 17.

A switch element 23 is provided in the connection of the output of the error signal generator 16 and the proportional-plus-integral controller circuit 17, 18 and is controlled by a comparator 24 which determines when the magnitude of a signal representing the rate of change of the high pressure spool speed exceeds a predetermined value.

In normal steady running of the engine the output of the differentiating circuit 22 and the output of the circuit 16 are both zero so that the trim signal is merely the output of the integrator 17. Normal closed loop proportional-plus-integral control of the trim signal takes place to maintain the required IEPR signal constant.

Any rapid change in PLA causes a consequent change in the trim datum signal so that the differentiating circuit 22 produces a non-zero output which is integrated by the integrator 17. In the event of the high pressure spool speed changing rapidly the switch 23 opens, breaking the trim loop and leaving the integrator output temporarily under the sole control of the differentiator 22.

In this way the integrator 17 output is caused to change slowly between the steady value it holds in one steady running state and the new value it will hold when steady running is again achieved. Overshoot problems are thereby avoided.

I claim:

1. A fuel control system in an engine said system including a hydromechanical speed governor fuel control influenced by a control input element operable by an operator of said engine, wherein said influence of said control input element is varied by an electromechanical trim device controlled by an electronic control circuit responsive to at least one engine parameter, said circuit includes:

error signal generating means for producing an error signal representing any difference between a desired and an actual value of said engine parameter;
   a proportional-plus-integral controller circuit means, responsive to said error signal and including an integrator, for producing an output signal which is applied to said electromechanical trim device;

means for generating a trim datum signal dependent on the control input; and a differentiating circuit to which the trim datum signal is applied, the output of the differentiating circuit being applied to the input of said integrator.

* * * * *